(12) United States Patent
Eshaghi

(10) Patent No.: US 8,715,502 B1
(45) Date of Patent: May 6, 2014

(54) HOSS' 4-STAGE BIOLOGICAL NUTRIENT REMOVAL (BNR) ACTIVATED SLUDGE PROCESS FOR REMOVAL OF TOTAL PHOSPHATE AND TOTAL NITROGEN TO A LEVEL BELOW 1.0 MG/L WITHOUT ANY CHEMICAL COAGULATION PROCESS SUCH AS ALUM OR FERRIC CHLORIDE USED FOR PHOSPHOROUS REMOVAL

(76) Inventor: Hossein Eshaghi, Cantonment, FL (US)

( * ) Notice: Subject to any disclaimer, the term of this patent is extended or adjusted under 35 U.S.C. 154(b) by 192 days.

(21) Appl. No.: 12/924,045

(22) Filed: Mar. 7, 2011

(51) Int. Cl.
*C02F 3/30* (2006.01)
(52) U.S. Cl.
USPC ............ 210/605; 210/623; 210/903; 210/906
(58) Field of Classification Search
CPC ........... C02F 2101/105; C02F 2101/16; C02F 2101/163; C02F 2101/166
USPC .......................... 210/605, 630, 903, 906, 623
See application file for complete search history.

(56) References Cited

U.S. PATENT DOCUMENTS

| | | | | |
|---|---|---|---|---|
| 5,344,562 A * | 9/1994 | Lorenz et al. | ................. | 210/607 |
| 5,702,604 A * | 12/1997 | Yamasaki et al. | ............. | 210/603 |
| 7,156,998 B2 * | 1/2007 | Reid | ............................. | 210/605 |
| 7,198,716 B2 * | 4/2007 | Reid | ......................... | 210/195.1 |
| 7,326,343 B2 * | 2/2008 | Nakhla et al. | ................. | 210/605 |
| 2008/0257820 A1 * | 10/2008 | Peeters et al. | ................. | 210/605 |

\* cited by examiner

*Primary Examiner* — Fred Prince

(57) ABSTRACT

A biological nutrient removal (BNR) system to treat a typical U.S. municipal/domestic wastewater. This BNR system consists of four main directly interflowing of anaerobic, aerobic, anoxic and re-aeration. In the municipal/domestic wastewater treatment industry, the past multi-stage suspended waste activated sludge treatment facilities have been adding coagulant chemicals such as alum to remove total phosphorous (TP) and total nitrogen (TN) to 1.0 mg/l and 3.0 mg/l, respectively. This BNR system is a unique activated sludge biological configuration capable of treating wastewater biologically for clarifier effluent TP and clarifier effluent TN to a level less than 1.0 mg/l for each pollutant without any coagulant chemical additions.

1 Claim, 3 Drawing Sheets

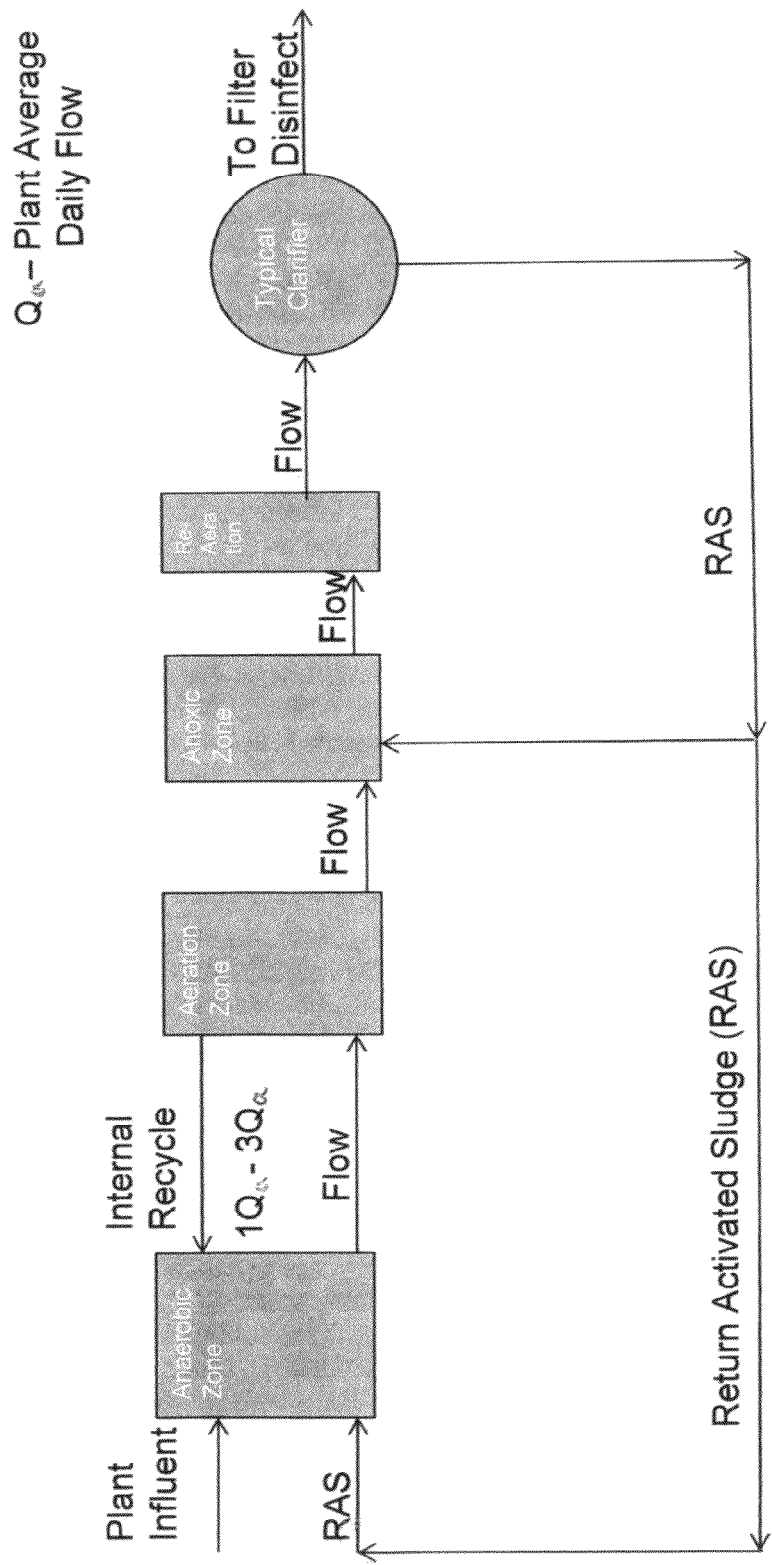
Figure 1, 4-Stage BNR System Process Diagram

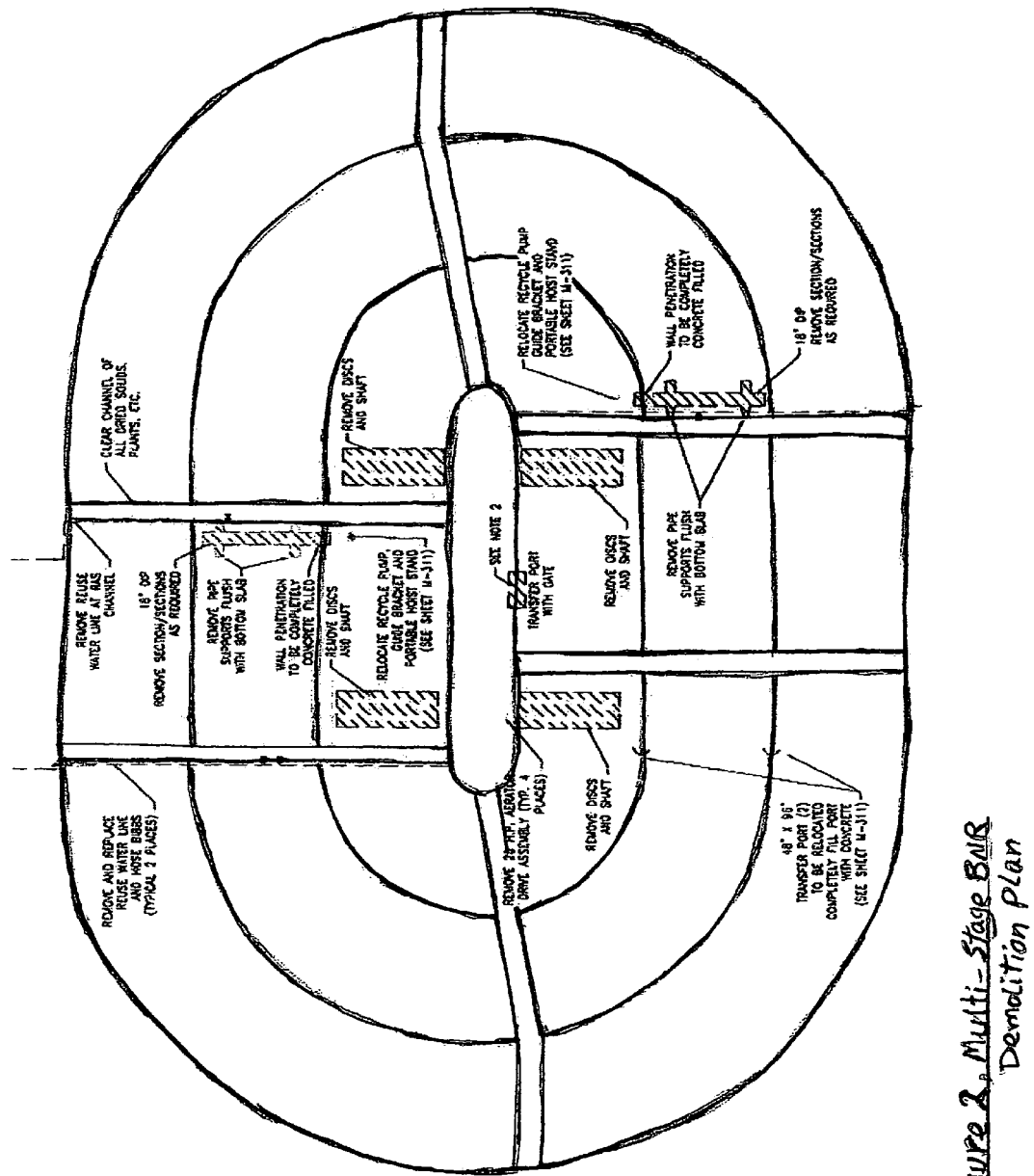

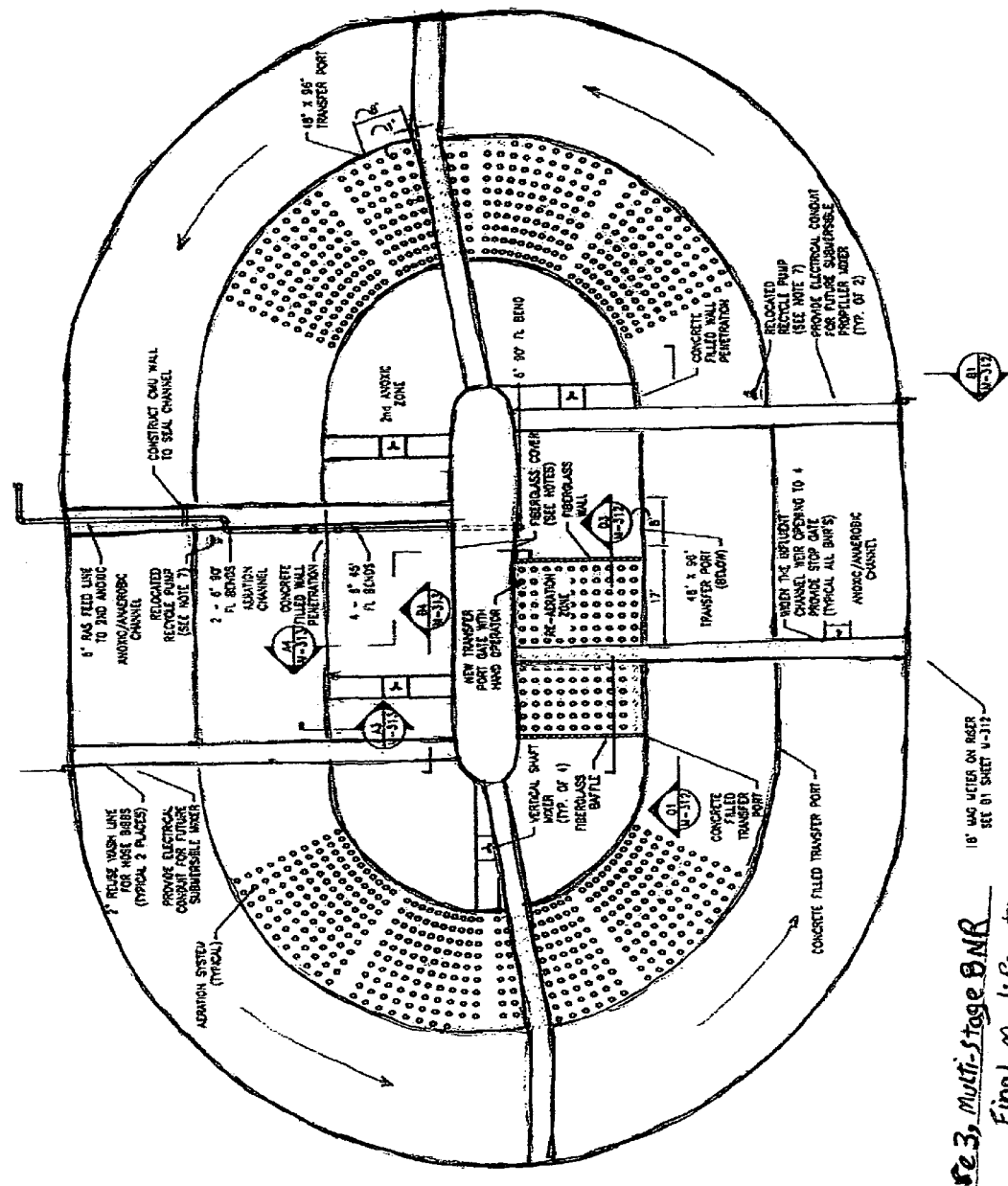

HOSS' 4-STAGE BIOLOGICAL NUTRIENT REMOVAL (BNR) ACTIVATED SLUDGE PROCESS FOR REMOVAL OF TOTAL PHOSPHATE AND TOTAL NITROGEN TO A LEVEL BELOW 1.0 MG/L WITHOUT ANY CHEMICAL COAGULATION PROCESS SUCH AS ALUM OR FERRIC CHLORIDE USED FOR PHOSPHOROUS REMOVAL

No other related exact application exists.

PREVIOUS PATENT APPLICATIONS

Most common biological nutrient removal (BNR) process is Bardenpho process consisted of five (5) stages of anaerobic, 1st anoxic, aerobic, $2^{nd}$ anoxic, and re-aeration. This BNR process has been utilized in the past 20 years or so, however, coagulant chemical addition (like alum or ferric chloride) has been required for this process to produce a total phosphorous of 1.0 mg/l or less. There are probably a lot of wastewater treatment plants that are producing an effluent with TP and TN of 1.0 mg/l or less but all of them utilizing some type of coagulant. Other patent applications have been made are either small laboratory type of setups of different process sequences with membrane system using very low flow of synthetic or municipal wastewater with very low influent phosphorous (U.S. Pat. No. 7,326,343, Nakhla, et al.); or a different process sequences using also flocculant (U.S. Pat. No. 5,344,562, Lorenz, et al.) to remove phosphorous; or a different process sequences using several coagulant chemicals (U.S. Pat. No. 5,702,604, Yamasaki, et al. and Patent Publication No. 2008/0257820, Peeters, et al.) to remove nitrogen. Some of the above patented processes were for industrial wastewaters.

There is not any federally sponsored research related to this invention.

BACKGROUND, OBJECTIVES AND SPECIFICATION

1. Background
  a. See the attached Confidential Proprietary Information, Invention Disclosure Form dated Aug. 10, 2010 for the background information, the prior problems at the subject facility and resolutions.
2. Objectives
  a. The effluent limits of a stringent surface water discharge are normally 5.0 mg/l CBOD, 5.0 mg/l of TSS, 3.0 mg/l Total Nitrogen and 1.0 mg/l Total Phosphorous. Floss' Multi-Stage BNR is a unique activated sludge biological configuration capable of achieving a Total Phosphorous removal biologically to a final result of less than 1.0 mg/l without the usage of costly chemical additions. Alum cost saving of about 83 pounds per million gallons of wastewater treated is reported by the Panama City Beach wastewater treatment plant.
  b. Achieving a biological Total Nitrogen removal to a final result of less than 1.0 mg/l without the usage of coagulant chemicals (Alum and Soda Ash at this plant) for a surface water discharge. The prior treatment process required the addition of chemicals such as Alum and Soda Ash to produce an effluent quality with less than 3.0 mg/l Total Nitrogen. This invention is actually capable of producing an effluent quality with less than 1.0 mg/l TN biologically without any coagulant chemical additions.
  c. The creation of Multi-Stage zones of biological processes directly interflowing Anaerobic, Oxic (Aeration), Anoxic and Re-aeration zones. These zones were not established in the previous process at the Panama City Beach wastewater treatment plant.
  d. Higher and more efficient biological treatment process reaction rates in each of the four (4) zones resulting in a lower overall hydraulic detention time for the BNR process.
  e. Up to 50 percent higher treatment capacities utilizing the existing similar basin volumes due to higher process reaction rates within this Multi-Stage BNR treatment zones. In the case of the Panama City Beach Plant, the facility was expanded from 10 MGD to 14 MGD utilizing the existing basin volumes.
3. Operation Protocol The operation protocol is described below is unique to this biological process configuration. The control of BNR Basins should be with PLC based control system (SCADA). The SCADA system shall be capable of monitoring and controlling automatically or manually the blowers, mixers, flow meters, drives, internal recycle pumps, RAS and dissolved oxygen (DO)/oxidation reduction potential (ORP) instruments. The BNR system is designed for a 4-Stage biological nutrient removal system consisting of directly interflowing Anaerobic zone, Aeration (Oxic) zone, Anoxic zone, and Re-aeration zone in each BNR unit as shown in FIG. 1, Process Diagram for the 4-Stage BNR system. In the automatic or manual mode the following functions of the BNR basins shall be controlled:

a. The mixers in the anaerobic zone shall be controlled by operator. The operator shall have the capability to manually operate or adjust the number of the mixers based on monitoring of ORP output. ORP set range shall be −800 mV to +200 mV with a probable optimum operating ORP range −200 mV to −50 mV for this zone depending on location of ORP as related to the Internal Recycle (IR) pumps. This range should be refined during the operation of the BNR units. High level ORP alarm should be set at −10 mV depending on the location of ORP probe.
  b. The start, stop, and speed of blowers or mechanical surface aerators in the aeration (Oxic) zone shall be controlled by the DO probes in each aeration basin. The operator shall control the start and stop of the blowers or aerators for aeration basins from the computer system. The operator should also be able to adjust the diffused aeration outputs by manually selecting the aeration grids and sub-grids or the number of surface aerators. DO probe operating range shall be 0.0 mg/l to 5.0 mg/l for an optimum operating DO range of 0.5 mg/l to 2.0 mg/l. Low level and high level DO alarms for the aeration basins shall be set for 0.3 mg/l and 3.0 mg/l, respectively, depending on the location of DO probe.
  c. The start and stop of the mixers in Anoxic basins shall be controlled by operator. These mixers normally run all the time. The Anoxic ORP set range shall be −200 mV to +200 mV. The optimum operating ORP range might be −50 mV to +50 mV for the Anoxic zone depending on location of ORP. This range shall be refined during the operation of each BNR plant. High level ORP of +55 mV should be an alarm condition.
  d. Internal Recycle (IR) Pumps: The start, stop, and speed of the IR pumps shall be automatically controlled based on the basins influent flow and the outer channel ORP setpoint selected by the operator.

e. RAS Pumping: The RAS sludge rate shall be manually controlled based on operator desire and RAS flow meter at the computer system.
f. A D.O. or an ORP out of range shall be an alarm condition. The failure of any mixer, blower, IR pump and RAS pump shall be an alarm condition.
g. In the manual mode the operators shall be able to start and stop any drives, blowers, aerators, mixer, IR Pump, RAS pump from the computer system.
h. The operator should be able to monitor the following for each basin: D.O., ORP, basin influent flow, IR pump running, IR flow rate, number of drives running, number of Blowers running, number of mixers running and RAS Flow Rate.

4. Unit Process Hydraulic Detention Time and Loadings

Each unit process will be equipped with proper mixing or aeration system to accomplish the biological treatment required for a complete oxidation of organic pollutants, nitrification, de-nitrification and biological phosphorous removal. The hydraulic detention time for each unit process will vary depending on the peak hourly loadings of each plant. However, a general hydraulic detention time for each unit will be as follows:
   a. The anaerobic zone will have a hydraulic detention time of over six (6) hours in one basin based on average daily flow (Qa). A method of mechanical or static mixing shall be provided to thoroughly mix the contents of this zone. The return activated sludge (RAS) flow rate should be typically around 30-60 percent of the plant average daily flow rate, normally practiced in the wastewater treatment plants, and not to exceed 125 percent of the plant average daily flow. The internal recycle capability from the aeration zone to anaerobic zone should be in the range of 1 to 3 times of the plant average daily flow but the normal operating range should be 1 to 2.0 times of the average daily flow.
   b. The aeration (oxic) zone should have a hydraulic detention time of over eight (8) hours based on the plant average daily flow rate. The aeration system is designed for the peak organic loadings to maintain dissolved oxygen (DO) around 2.0 mg/l. A complete mixing of the zone should be provided by the aeration or a combination of aeration and mixing devices. A diffused aeration system is preferred due to its higher oxygen transfer efficiencies. Internal recycle from aeration zone to anaerobic zone should be by a mechanical means for a recycle range of 1 to 3 times the plant average daily flow rate.
   c. The anoxic zone should have over two (2) hours of hydraulic detention time based on the plant average daily flow rate. This zone shall be mixed completely by mechanical or static mixing devices. The anoxic zone should also receive a portion of return activated sludge (RAS) flow to supplement the carbon source in this zone. The carbon source may be needed for a complete de-nitrification in this zone.
   d. The re-aeration zone should have over 30 minutes detention time based on the plant average daily flow rate. The aeration of this zone will be by diffused aeration or a mechanical aerator.
   e. A typical clarifier should be used with the typical hydraulic detention time of 4 to 6 hours based on average daily flow rate and different configuration like circular or rectangular being utilized in the wastewater treatment facilities as needed. No drawings of clarifier, filter, or disinfection systems are presented because they will be the typical ones as needed and are not the premises of this invention. Hoss' Multi-Stage BNR process can also be followed by membrane system to achieve the stringent limits of below 1.0 mg/l of total phosphorus and total nitrogen and therefore, eliminate the need for typical clarifier and/or filter.
   f. The other treatment units such as filtration and disinfection are the typical processes that are normally provided after the BNR system.

5. Brief Drawings Descriptions

FIG. 1 is a process diagram of this 4-Stage BNR process that shows the premise of this invention.

FIG. 2 is the demolition plan of the existing 3-channel oxidation ditch system at the Panama City Beach wastewater treatment facility to show the actual operating plant case.

FIG. 3 shows one of the four actual 4-Stage BNR system at the City Panama City Beach facility which have been in operation since July 2010.

6. Detailed Drawings Descriptions

There are three (3) figures included in this application that are described as follows:
   a. FIG. 1 is a process diagram for this 4-Stage BNR system. This figure shows the premise of the invention that is, its unique biological configuration. The plant influent that is usually pre-screened and de-gritted normally enters the first zone of anaerobic zone and well mixed with the biomass contents of this zone to biologically release phosphorous and to accomplish majority of de-nitrification process. This zone shall be completely mixed. The oxidation of pollutants and nitrification occurs in the aeration zone where a portion (normally 1-2 Qa) of the nitrified biomass is recycled back to the first zone for de-nitrification and phosphorous release/removal. The aeration zone shall be aerated preferably by a diffuse air system and shall also be completely mixed. The desired dissolved oxygen in this zone shall be over 0.5 mg/l but, should not normally exceed 2.5 or 3 mg/l: The anoxic zone receives flow directly from the aeration basin to polish and complete the de-nitrification process. The re-aeration process provides sufficient dissolved oxygen (DO) in the biomass before discharging into the clarifier (sedimentation basin) to prevent a septic (or anaerobic) condition in the clarifier. The majority of the return activated sludge (RAS) flow from the clarifier is returned to the anaerobic zone but, a portion of it may need to be returned to anoxic zone as a carbon source for the de-nitrification process. The biomass is settled in the clarifier separating the water from solids. In the BNR processes, the clarified water then normally goes through the filtration and disinfection processes before the final disposal.
   b. FIG. 2 is the demolition plan of the existing 3-channel oxidation ditch system at the Panama City Beach wastewater treatment facility. This figure is included in this application only to show the actual operating case. Some of the disc aerators were removed to accommodate the Hoss' Multi-Stage BNR system. The outside channel normally has two submersible large blades mixers. In the case of the Panama City Beach plant, the disc mixers in the outer channel were left in as a compromise with Siemens (manufacturer of disc mixers) but, this type of mixers will not be typically used in the Hoss' Multi-Stage BNR system due to possible hindering of the treatment process due to the air introduction into the anaerobic environment. Because of inefficiency of disc aerators or any mechanical surface aerators, there will not normally be any mechanical surface aerators in the Multi-Stage BNR system due to their inefficiencies in oxygen transfer. But, in the case of the Panama City Beach Plant, the existing disc aerators were left in as a compromise with Siemens (manufacturer of the disc aerators). The internal recycle wall pumps were also relocated to be able to transfer the nitrified biomass from the aeration zone to anaerobic zone.

c. FIG. 3 is the Hoss' Multi-Stage BNR system at the Panama City Beach facility. The existing old disc aerators, piping and valve systems are screened or not showing on purpose to demonstrate the unique biological configuration with new aeration and mixing equipment. The piping and valve systems and mixing devices are typical and are not the premise of invention. The Multi-stage biological configuration as shown in FIG. 1 is the premise of the invention. This figure is included in this application only to show the actual operating case.

Even though this process invention was applied to an oxidation ditch system at this facility but this Multi-Stage BNR system is not limited to oxidation ditches and this Multi-Stage BNR system applies to all conventional wastewater treatment processes for municipal/domestic wastewater.

The anaerobic zone (outer channel) is equipped with mechanical mixer(s) to completely mix the biomass. The influent flow, RAS and internal recycle flow injections into the anaerobic zone must be located so that the treatment process in this zone is optimized.

The aeration zone (middle channel) is normally aerated by fine or coarse bubble diffusers that are more efficient than mechanical surface aerators. This zone must also be completely mixed as well as aerated. Therefore, mechanical mixer(s) may also be needed for this zone. In the case of the Panama City Beach facility, the existing disc mixers and aerators were kept as a compromise with Siemens. However, a fine bubble diffuser aeration system was added for the proper treatment process in this zone. The influent and effluent ports for this zone must be properly located to prevent short circuiting and to promote a proper treatment process in this zone. The existing basin depths at the Panama City Beach plant were about 12' in side water depth. But, an aeration zone with the diffused aeration system should be in the 16'-18' side water depth range for a more efficient oxygen transfer process.

The anoxic and re-aeration zones (center channel) were developed in this case in the center channel by dedicating the first and majority portion of the channel to anoxic zone with complete mixing of the biomass in this zone. The mixers in this zone can be submersible, vertical shaft type of mechanical mixers or static mixers. In this figure the anoxic zone is being mixed by four (4) vertical shaft mixers mounted on platforms. The inlet and outlet of this zone shall be located as such to prevent short circuiting and to promote a proper treatment process approaching a near the plug flow pattern. The re-aeration zone is a small area zone to add sufficient air to the biomass to prevent a septic condition in the downstream process of clarification. Diffused air is a more efficient aeration process in this zone but, the mechanical surface aerators can also be used in this zone. The re-aeration zone is isolated from the anoxic zone by a full wall baffle on one side and an overflowing baffle wall on the zone's influent side. The discharge from this zone is normally directed to a clarification process followed by filtration and disinfection prior to final disposal.

The invention claimed is:

1. A biological nutrient removal (BNR) suspended waste activated sludge treatment process to treat a municipal wastewater, said process comprising the steps of:
   a. Flowing screened and de-gritted municipal plant wastewater influent containing nitrogen and phosphorus through four main stages directly interflowing of anaerobic, oxic (aerobic), anoxic, and re-aeration zones prior to clarification in a clarifier having a weir and
   b. Recycling internal mixed liquor suspended solids from the end of the aerobic (oxic) zone to the anaerobic zone and return activated sludge returning from the clarifier underflow to the anaerobic zone with a portion diverted to the anoxic zone for a carbon source and
   c. Producing a liquid effluent from the weir of the clarifier having less than 1.0 mg/l of total phosphorus and 1.0 mg/l of total nitrogen without any coagulant chemical additions.

* * * * *